United States Patent
Adzhalov

(10) Patent No.: US 7,590,352 B2
(45) Date of Patent: Sep. 15, 2009

(54) ACCESS METHOD FOR DATA PACKET NETWORKS

(76) Inventor: Vladimir Isfandeyarovich Adzhalov, u. Lesnaya, d, 63/43, kv, 139, Moscow (RU) 103055

( * ) Notice: Subject to any disclaimer, the term of this patent is extended or adjusted under 35 U.S.C. 154(b) by 1097 days.

(21) Appl. No.: 10/472,102

(22) PCT Filed: Apr. 16, 2001

(86) PCT No.: PCT/RU01/00150

§ 371 (c)(1),
(2), (4) Date: Sep. 12, 2003

(87) PCT Pub. No.: WO02/075964

PCT Pub. Date: Sep. 26, 2002

(65) Prior Publication Data

US 2004/0114928 A1 Jun. 17, 2004

(30) Foreign Application Priority Data

Mar. 15, 2001 (RU) .............................. 2001106820

(51) Int. Cl.
*H04J 14/00* (2006.01)

(52) U.S. Cl. .................. 398/71; 359/159; 359/172; 359/125; 359/118

(58) Field of Classification Search ............... 398/76, 398/89, 99, 98, 111, 154, 185, 198, 359, 398/172, 159, 152, 118, 125, 58, 59, 66, 398/123, 114, 71; 370/389, 590, 465, 907, 370/351, 352, 3.1; 455/609, 610, 612; 359/159, 359/172, 152, 118, 125

See application file for complete search history.

(56) References Cited

U.S. PATENT DOCUMENTS

| | | | | |
|---|---|---|---|---|
| 3,818,222 A | * | 6/1974 | Jensen et al. | 250/214 LA |
| 5,119,223 A | * | 6/1992 | Panzer et al. | 398/75 |
| 5,341,375 A | * | 8/1994 | Buchholz et al. | 370/349 |
| 5,457,561 A | * | 10/1995 | Taneya et al. | 398/120 |
| 5,515,183 A | * | 5/1996 | Hashimoto | 359/9 |
| 5,737,113 A | * | 4/1998 | Kuramochi et al. | 359/259 |

(Continued)

FOREIGN PATENT DOCUMENTS

| | | | |
|---|---|---|---|
| EP | 0325429 | | 7/1989 |
| EP | 1054520 A1 | * | 11/2000 |
| GB | 2199209 | | 6/1988 |
| RU | 2090004 | | 9/1997 |

(Continued)

*Primary Examiner*—Ricky Ngo
*Assistant Examiner*—David Oveissi
(74) *Attorney, Agent, or Firm*—Collard & Roe, PC

(57) ABSTRACT

A method of organizing access to packet data transmission networks includes extracting data packets addressed to the subscribers of a subscriber access point from the network and transmitting the information contained in these packets by a directional electromagnetic radiation beam. The beam is directed at the receiving devices of subscribers at their respective addresses. The method is used to transmit information to subscribers by optical-range electromagnetic radiation while dynamically controlling the spatial characteristics of the electromagnetic radiation beam using the address information of the packets so that the radiation beam is directed to the receiving device of a respective subscriber during transmission of a particular data packet. In one embodiment uses an electromagnetic radiation beam of narrow angular divergence and the direction of its propagation is varied dynamically.

2 Claims, 1 Drawing Sheet

U.S. PATENT DOCUMENTS

Figure 1:
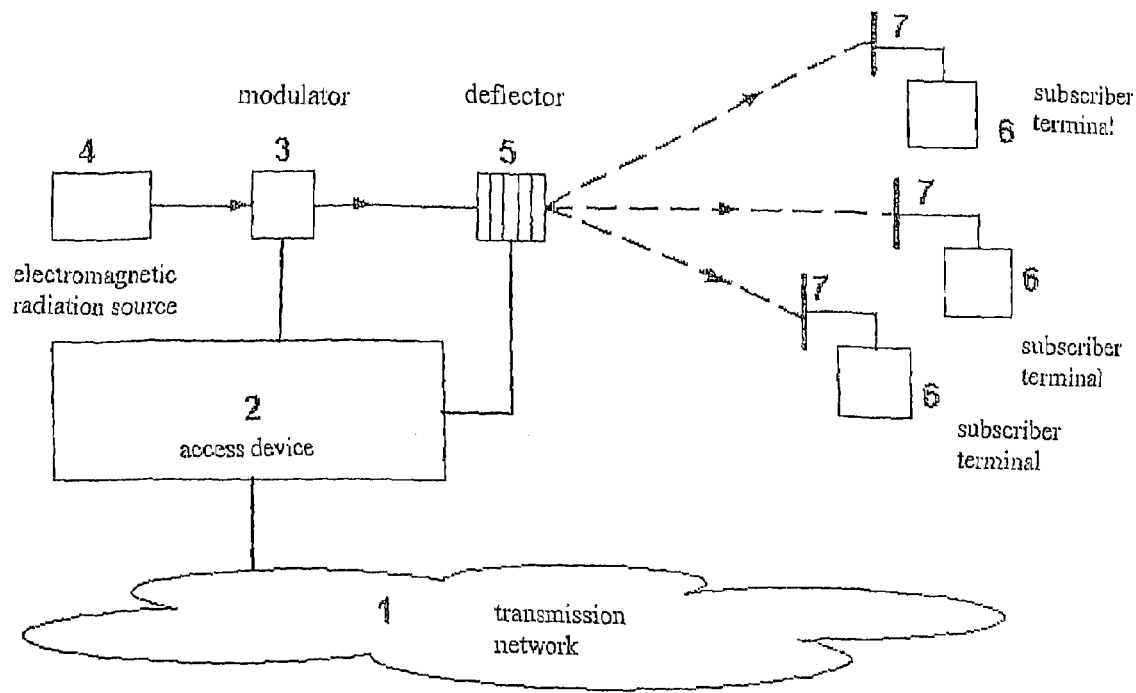

| | | | | |
|---|---|---|---|---|
| 5,786,923 A | * | 7/1998 | Doucet et al. | 398/122 |
| 5,825,523 A | * | 10/1998 | Amitai | 359/209 |
| 6,052,498 A | * | 4/2000 | Paniccia | 385/14 |
| 6,122,419 A | * | 9/2000 | Kurokawa et al. | 385/31 |
| 6,512,614 B1 | * | 1/2003 | Saleh et al. | 398/47 |
| 6,650,451 B1 | * | 11/2003 | Byers et al. | 398/129 |
| 7,215,658 B2 | * | 5/2007 | Alastalo et al. | 370/338 |
| 7,280,757 B1 | * | 10/2007 | Britz et al. | 398/58 |
| 2004/0076151 A1 | * | 4/2004 | Fant et al. | 370/389 |

FOREIGN PATENT DOCUMENTS

| | | |
|---|---|---|
| RU | 2097927 | 11/1997 |
| RU | 227489 | 3/1999 |
| WO | 1 054 520 | 11/2000 |
| WO | WO 01/05072 | 1/2001 |

* cited by examiner

ACCESS METHOD FOR DATA PACKET NETWORKS

CROSS REFERENCE TO RELATED APPLICATIONS

Applicants claim priority under 35 U.S.C. §119 of Russian Application No. RU 2001106820 filed on Mar. 15, 2001. Applicants also claim priority under 35 U.S.C. §365 of PCT/RU01/00150 filed on Apr. 16, 2001. The international application under PCT article 21(2) was not published in English.

FIELD OF THE INVENTION

This invention relates to optical communications and is designed for use in data transmission networks.

PRIOR STATE OF THE ART

Known in the art are methods of organizing systems allowing subscribers to access data transmission networks based on fiber optics communication systems (see, for example, Russian Patent No. 2,127,489, IPC H04B 10/12).

Prior art methods of organizing systems to give subscribers access to a data transmission network provide for extracting packets (cells) containing the addresses of subscribers being served from the network, converting the signals and transmitting them in fiber optics cables connecting the respective optical receivers and transmitters on the side of the access point and on the subscriber side. A major drawback of such methods is high installation and operation costs of a fiber optics communication line that place it beyond the reach of ordinary subscribers.

The closest prior art of the present invention in technical idea is a method of organizing access to packet data transmission networks wherein a data packets addressed to subscribers of a subscriber access point are extracted from the network and the information contained in the data packets is transmitted by an electromagnetic radiation beam that is directed to the receiving devices of subscribers at respective addresses (Communication World-Connect, No. 7, 2000, pp. 93-94, in Russian).

An example of a prior art method, or prototype, is provided by the Alcatel 9900 system (ibid.). This is a wireless access system operating within the microwave range of 24.25 to 29.5 GHz. The base station (subscriber access point) has a standard ATM network interface and is adapted to extract data packets addressed to the subscribers of this access point from the data stream. All the subscribers of a station are allocated to four service sectors combined into a circle diagram. The subscriber data packets corresponding to a particular sector are used, together with the ATM addresses combined with the subscriber codes for modulating the electromagnetic radiation beam emitted by a directional transmitting antenna serving a respective sector. The subscriber devices filter data addressed to specified subscribers from the overall information stream transmitted by a single electromagnetic radiation beam to the sector as a whole.

The most serious drawbacks of this method are its low speed and relatively low cost-effectiveness of data transmission.

This invention is designed to raise the speed and cost-effectiveness of data transmission and to simultaneously expand the functional possibilities of the access system.

The technical effect that can be achieved by performing this method consists in lowering capital and operating costs per unit of information transmitted and at the same time in raising the overall maximum access speed. Subsidiary technical effects include allowing various groups of users to be organized at different service levels within a single service sector by using different electromagnetic radiation beams (including a single wavelength), and also enhancing security against unauthorized access.

To attain this objective and achieve the above technical effect in the prior art method of organizing access to packet data transmission networks, wherein data packets addressed to subscribers of a subscriber access point are extracted from the network and the information contained in the data packets is transmitted by an electromagnetic radiation beam directed at the receiving devices of subscribers at the respective addresses, according to this invention uses optical-range electromagnetic radiation is used to transmit information to subscribers, and the spatial characteristics of the electromagnetic radiation beam are controlled using the address information of the data packets so that, during transmission of a particular data packet, the radiation beam is directed at the receiving device of a respective subscriber.

Other embodiments of this method can be used, wherein it is advisable to:

use an electromagnetic radiation beam of a narrow angular divergence and dynamically vary the direction of its propagation; and control the spatial characteristics of the beam by a dynamic hologram that is, for each registered subscriber address, an optical match of the aforesaid electromagnetic radiation beam and the input window of the subscriber's receiver at that address.

ESSENCE OF THE INVENTION

The essence of this invention and its subsidiary embodiments is explained below with reference to drawings that illustrate diagrammatically the various embodiments of the access system organized in accordance with the method of this invention. The drawings and the following text do not clarify a method of transmitting information from subscribers to an access point, because this method is not essential for achieving the expected positive effect.

FIG. 1 shows a possible structural diagram of an access system according to the method disclosed herein on the basis of an embodiment using an electromagnetic radiation beam of narrow angular divergence.

Figure 2:
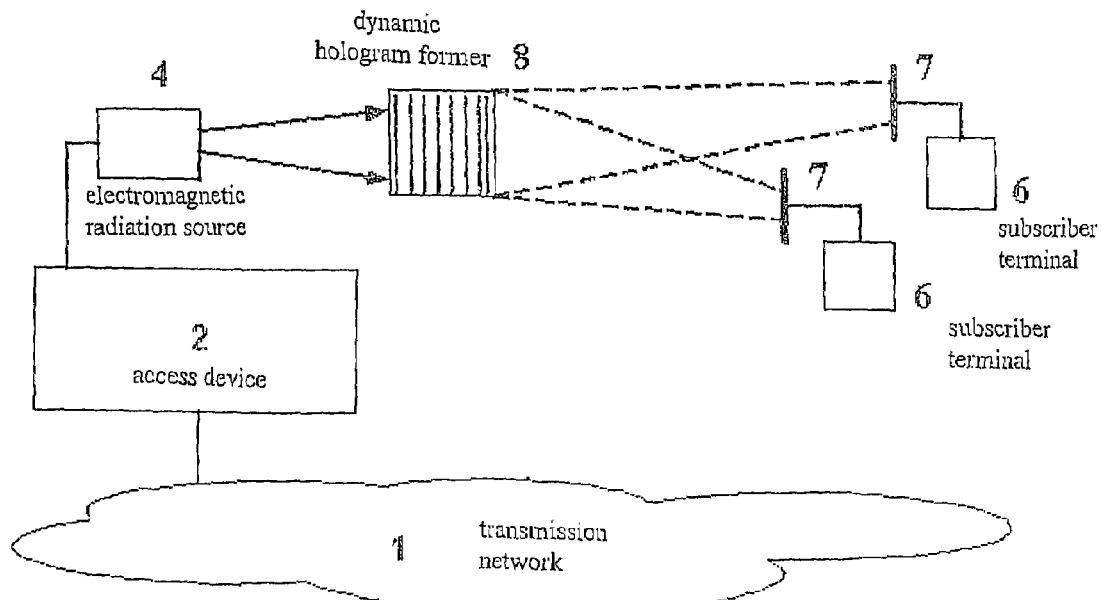

FIG. 2 shows diagrammatically data transmission network 1, device 2 providing access to data transmission network, modulator 3, electromagnetic radiation source 4, device 5 to deflect an electromagnetic radiation beam, subscriber terminals 6, and subscriber receiving devices, or antennas 7.

Data transmission network 1 is accessed through access device 2. Device 2 extracts data packets addressed to the subscribers of a particular service sector from the information stream and the packets are directed at modulator 3. Radiation from laser—electromagnetic radiation source 4 (or another narrow angular divergence source) is modulated in this embodiment by varying the optical power thereof with the aid of modulator 3, even though sources directly modulating any specific parameters of an electromagnetic radiation beam can be used. Information about the address of data packet, used at a particular moment for beam modulation, is transmitted, prior to the start of the beam modulation cycle, to a deflecting device (deflector) 5. Deflector 5 is used to alter the direction in which the electromagnetic beam is propagated by directing it, during transmission of the packet addressed to a particular subscriber 6, to the subscriber's receiving device 7.

FIG. 2 illustrates another embodiment of the method described herein. FIG. 2 shows a diagrammatic view of data transmission network 1, device 2 providing access to the data transmission network, directly modulated electromagnetic radiation source 4, dynamic hologram forming device 8, and subscriber terminals 6 with receiving devices (antennas) 7.

In this particular auxiliary embodiment of the claimed method, data transmission network 1 is also accessed through access device 2. Data packets addressed to subscribers of a particular service sector are extracted from the information streams and used for modulating the radiation of the source 4. Optical power (or another parameter) of electromagnetic radiation from the source 4 is modulated directly by information contained in the data packet transmitted to a particular subscriber, and the address information is used for forming dynamic holograms in device 8. Holograms are actually diffraction lattices (flat or three-dimensional according to the method by which they are formed in device 8), which are used to focus radiation from source 4 on receiving device 7 of subscriber 6 at a respective address during data transmission to the subscriber.

In contrast to the prior art method and other similar methods, the use of optical frequency range in combination with address control of an electromagnetic radiation beam during data packet transmission allows transmission speed to be increased in orders (in proportion to the ratio of the radio frequency used previously to the optical range frequency) and lowering the power required per subscriber. Besides, capital and operating costs per unit of information transmitted are reduced accordingly. It also becomes possible to deploy several (two or more) systems within a single physical service sector (the same area) to provide access to the same or other transmission networks at the same optical frequency, including services provided at different levels of quality. Addressed direction of an information-carrying electromagnetic radiation beam (in fact, data packets transmitted themselves) helps to enhance security of transmission against unauthorized access.

The use of this method (and its subsidiary embodiments), therefore, allows the claimed task to be fulfilled and the expected technical effect achieved.

INDUSTRIAL APPLICABILITY

The claimed invention can be used extensively in data transmission networks to provide data transmission to different groups of users at different service levels within a single service sector by using different electromagnetic radiation beams.

The invention claimed is:

1. A method of organizing access to a packet data transmission network comprising the steps of:
   (a) extracting from a packet data transmission network data packets addressed to subscribers of a subscriber access point; and
   (b) transmitting information contained in the data packets by an electromagnetic radiation beam of electromagnetic optical-range radiation directed at receiving devices of subscribers at respective addresses, while dynamically controlling spatial characteristics of the electromagnetic radiation beam using packet address information so that the electromagnetic radiation beam is directed at a receiving device of a respective subscriber during transmission of a particular data packet;
   wherein the spatial characteristics of the electromagnetic radiation beam are controlled by a dynamic hologram that is, for each registered subscriber address, an optical match of the source of said electromagnetic radiation beam and the receiver of the subscriber at that address.

2. The method as claimed in claim 1, wherein the electromagnetic radiation beam has a narrow angular divergence and wherein the method further comprises the step of varying a direction of propagation of the electromagnetic radiation beam dynamically.

* * * * *

UNITED STATES PATENT AND TRADEMARK OFFICE
CERTIFICATE OF CORRECTION

PATENT NO.         : 7,590,352 B2                              Page 1 of 1
APPLICATION NO.    : 10/472102
DATED              : September 15, 2009
INVENTOR(S)        : Vladimir Isfandeyarovich Adzhalov It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1766 days.

Signed and Sealed this

Twenty-first Day of September, 2010

David J. Kappos
*Director of the United States Patent and Trademark Office*